(12) United States Patent
Hemery et al.

(10) Patent No.: US 8,397,882 B2
(45) Date of Patent: Mar. 19, 2013

(54) SYSTEM AND METHOD FOR EXTERNALLY FASTENING CABLES OR LINES TO A BRAKE CYLINDER

(75) Inventors: Franck Hemery, Honfleur (FR); Alain Fantazi, Dives sur mer (FR); Vincent Martin, Les Monceaux (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 1244 days.

(21) Appl. No.: 11/911,861

(22) PCT Filed: Apr. 18, 2006

(86) PCT No.: PCT/EP2006/003506
§ 371 (c)(1),
(2), (4) Date: Jul. 22, 2008

(87) PCT Pub. No.: WO2006/111342
PCT Pub. Date: Oct. 26, 2006

(65) Prior Publication Data
US 2008/0283685 A1    Nov. 20, 2008

(30) Foreign Application Priority Data
Apr. 19, 2005  (DE) .......................... 10 2005 018 038

(51) Int. Cl.
*B60T 11/10* (2006.01)

(52) U.S. Cl. .................................................. 188/153 D

(58) Field of Classification Search .............. 188/153 R, 188/153 D, 170; 92/63; 248/222.11
See application file for complete search history.

(56) References Cited

U.S. PATENT DOCUMENTS

| | | | | |
|---|---|---|---|---|
| 5,377,579 | A | * | 1/1995 | Pierce ............................... 92/63 |
| 5,393,021 | A | * | 2/1995 | Nelson ............................. 248/71 |
| 5,799,830 | A | * | 9/1998 | Carroll et al. ................... 222/95 |
| 5,967,468 | A |   | 10/1999 | Veghte et al. |
| 6,389,954 | B1 | * | 5/2002 | Constantinides et al. ........ 92/78 |

FOREIGN PATENT DOCUMENTS

| | | |
|---|---|---|
| DE | 10 2004 044 939 A1 | 11/2005 |
| EP | 1 588 917 A1 | 10/2005 |
| JP | 2003-168878 A | 6/2003 |

OTHER PUBLICATIONS

International Search Report dated Jul. 18, 2006 with English translation of relevant portion (Four (4) pages).
International Preliminary Examination Report with English translation of Amended Sheets (Fourteen (14) pages).

\* cited by examiner

*Primary Examiner* — Robert A Siconolfi
*Assistant Examiner* — Anna Momper
(74) *Attorney, Agent, or Firm* — Crowell & Moring LLP

(57) ABSTRACT

A fastening device for externally fastening cables or lines to housings, especially to the housing of brake cylinders, includes a fastening pin that can be locked in a breather of the housing. A connecting channel is configured in the fastening pin via which channel, in the locked state, the interior of the housing communicates with the atmosphere.

4 Claims, 2 Drawing Sheets

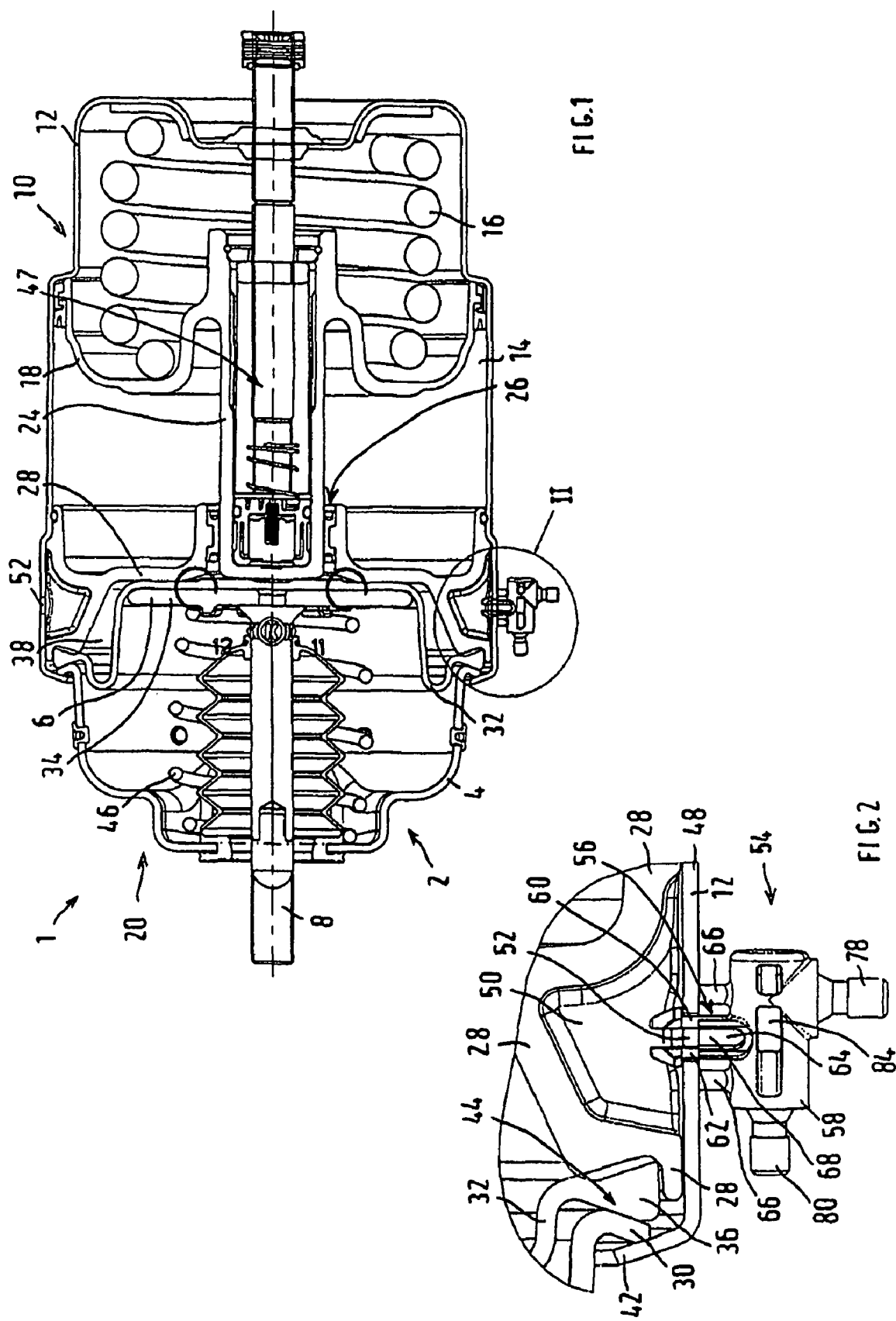

SYSTEM AND METHOD FOR EXTERNALLY FASTENING CABLES OR LINES TO A BRAKE CYLINDER

BACKGROUND AND SUMMARY OF THE INVENTION

Figure 3:
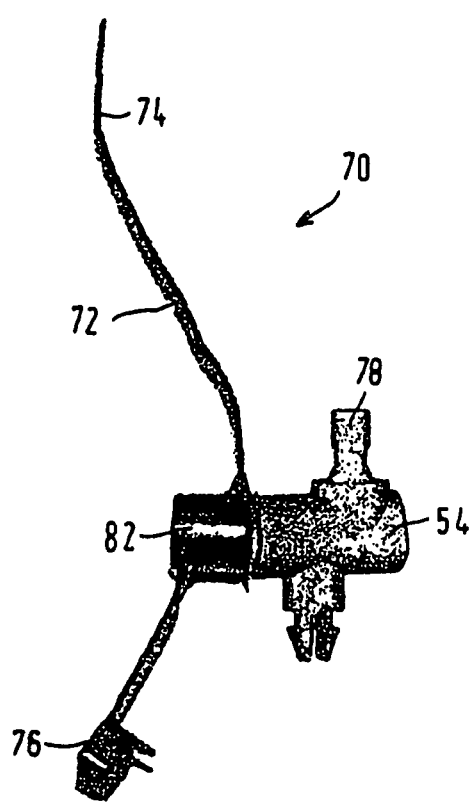

The invention relates to a fastening device used for externally fastening cables or lines to a structure, including a fastening pin, which can be locked to an opening in the structure and in which a connecting duct is formed.

Such a fastening device is described in JP 2003-168878 A and serves to fasten cables to a board. A fastening device of the same type is disclosed in U.S. Pat. No. 5,967,468 A. It secures an antenna cable to a tower.

A fastening device for externally fastening cables or lines to a housing of a brake cylinder is described in the previously unpublished DE 10 2004 04 4939. It includes a fastening clamp which is connected, on the one hand, to an annular flange of the housing part of a brake cylinder and, on the other hand, to the housing via a pin, which can be locked in the breather of the housing.

The present invention provides an improved fastening device in terms of its functionality for fastening cables or lines to housings.

The present invention provides a fastening device used for externally fastening cables or lines to a structure, including a fastening pin which can be locked to an opening in the structure and in which a connecting duct is formed for locking the fastening pin in a breather opening of a housing, in particular in a breather opening of a housing of a brake cylinder, in order to connect the interior of the housing to the atmosphere in the locked state.

The invention proposes using advantageously a fastening device, known from JP 2003-168878 A and from U.S. Pat. No. 5,967,468 A, for locking the fastening pin in a breather of a housing, in particular in a breather of a housing of a brake cylinder. Then, in the locked state the interior of the housing is connected to the atmosphere. Because a connecting duct is formed in the fastening pin, the breather is not closed off and can thus continue to carry out the function of ensuring that condensed water runs off from the interior of the housing to the outside, and that there is an exchange of air. This is essential in particular if, as is customary in practice, a plurality of cables and lines are fastened to the housing of a brake cylinder, and accordingly the majority of the breathers have to serve as fixing points for the fastening devices, which would otherwise be closed off and would thus have to be supplemented by other breathers which increase the fabrication costs.

In particular, a plurality of breathers can (or breather openings) advantageously be provided with such a fastening device without the exchange of air or the flowing off of condensed water being adversely affected by this so that cables and lines can also be connected to a plurality of locations on the housing. Since the breathers can then carry out their venting and water draining function unimpeded, the risk of corrosion in the interior of the housing is thus reduced, which is highly advantageous, in particular in brake cylinders which are significant for safety.

Advantageous developments and improvements of the invention are further described and claimed herein.

The fastening device is, in particular, preferably fastened to the housing only via the fastening pin, and the fastening pin is locked in the breather in such a way that the fastening device can be pivoted about a pin axis with respect to the housing. As a result, the cables and lines, which generally have a certain degree of rigidity, can align themselves freely with respect to the housing by virtue of the fact that the fastening device pivots in the respective direction. As a result, deflection or bending of the cables and lines can be avoided, which, on the one hand, increases their service life owing to the freedom from tension and, on the other hand, permits a short laying length, which is advantageous in particular in the case of pneumatic lines of brake cylinders, which have a length-dependent flow resistance.

The locking of the fastening pin to the breather of the housing can be implemented, for example, by virtue of the fact that the fastening pin contains at least two elastically deformable limbs which project away from a base body and have an intermediate slot which forms the connecting duct. As a result, the fastening pin performs a double function in that it both ensures that the fastening device is fastened to the housing in a lockable fashion and that, at the same time, it forms the connecting duct.

Closure of the connecting duct when the fastening pin is locked in the breather is prevented, for example, by virtue of the fact that at least one spacer element, which is in contact with an outer surface of the housing in the locked state, projects away from the base body such that an end section of the duct, which extends beyond the outer surface, is connected to the atmosphere, at least at the side.

According to a further preferred measure, the base body can also be provided with a through slot for feeding through an elastic plastic cable connector which is wrapped around the cables and lines to be fastened to the housing. In addition, the base body can be provided with at least two standardized receptacles for such elastic plastic cable connectors, which point in different directions. Cables and lines which cross over one another can then be fastened to the housing in a bundled fashion. In combination with the possibility of pivoting the fastening device, it is consequently possible to cover a large number of directions in which the cables and lines can extend with respect to the housing without deflection.

The plastic cable connectors can, preferably, also be locked to the standardized receptacles, for example by virtue of the fact that the standardized receptacles are formed by receptacle pins which have an undercut cross section and which can be locked into openings in fastening sections of the plastic cable connectors.

BRIEF DESCRIPTION FO THE DRAWINGS

An exemplary embodiment of the invention is illustrated in the drawing and will be explained in more detail in the following description. In the drawing, FIG. 1 is a cross-sectional illustration of a brake cylinder with a fastening device according to a preferred embodiment of the invention;

FIG. 2 is a partially exploded view of a detail of the fastening device in FIG. 1; and FIG. 3 is a perspective view of the fastening device in FIG. 1 with an elastic plastic cable connector fastened to it.

DETAILED DESCRIPTION OF THE DRAWINGS

FIG. 1 shows a combined service brake and spring-loaded brake device 1. The latter includes a service brake device 2 with a service brake cylinder 4 in which a pneumatically actuable service brake piston 6 is guided. The service brake piston 6 activates, for example, a disk brake (not shown for reasons of scale) of a utility vehicle via a service brake piston rod 8. Furthermore, there is a spring-loaded brake device 10 with a spring-loaded brake cylinder 12, in which a spring-loaded brake piston 18 which can be tensioned counter to the spring force of a storage spring 16 is guided by pneumatic pressure in a spring-loaded brake chamber 14. The service brake piston 6 can be acted on in the brake application direction by the spring-loaded brake piston 18. The service brake cylinder 4 and the spring-loaded brake cylinder 12 form, in their coaxial arrangement one behind the other, a combination brake cylinder 20.

A spring-loaded brake piston rod 24 of the spring-loaded brake piston 18 penetrates a through opening 26 in a dividing wall 28 between the spring-loaded brake cylinder 12 and the service brake cylinder 4 in a seal-forming fashion and can abut with its end face against the service brake piston 6. The latter can contain an axially movable diaphragm 32, which is clamped in at the outer edge side between the dividing wall 28 and a radially outer shoulder 30 at the edge of the service brake cylinder 4, and a central piston disk 34 which is connected to the diaphragm 32 (see FIG. 2).

The shoulder 30 is preferably bent over through more than 90° so that an oblique contact face with the diaphragm 32 is produced. On the other hand, the dividing wall 28 is provided on its radially outer edge with an oblique contact face so that between them a cross section which widens radially outward in the form of a wedge is produced, the outer edge 36, which is shaped in a complementary way, of the diaphragm 32 being held in a positively locked fashion. In order to stabilize this positively locked engagement and to connect the service brake cylinder 4 to the spring-loaded brake cylinder 12, one edge 42 of the spring-loaded brake cylinders 12 engages over the shoulder 30 of the service brake cylinder 4 in a positively locking fashion, in particular by way of a positively locking flange 44, at which the edge 42 of the spring-loaded brake cylinder 12 is plastically deformed.

It is also possible, in a known fashion, to move the spring-loaded brake piston 18 into the release position counter to the effect of the storage spring 16 by ventilating the spring-loaded brake chamber 14. Furthermore, by ventilating a service brake chamber 38, which extends between the dividing wall 28 and the service brake piston 6, it is possible to move the service brake piston 6 into the brake application position counter to the effect of a return spring 46 which is supported, on the one hand, on the service brake piston 6 and, on the other hand, on an end wall of the service brake cylinder 4. It is also significant that a mechanical release device 47, with which an emergency release of the spring-loaded brake device 10 can be performed in the event of a loss of pressure, is integrated within the spring-loaded brake piston rod 24.

The functional method of such a combined service brake and spring-loaded brake device 1 has been sufficiently described, for example, in DE 10 2004 060 862 A1, for which reason more details will not be provided here.

An annular chamber 50, which is formed between the dividing wall 28 and a having wall 48 of the spring-loaded brake cylinder 12, in the interior of the combined service brake and spring-loaded brake device 1, is connected to the atmosphere by way of a plurality of breathers 52, which are arranged distributed over the circumference in the having wall 48 in the region of the flange 44.

A fastening device 54, which includes a fastening pin 56 which can be locked in one of the breathers 52 is provided for externally fastening lines, in particular pneumatic lines or cables, to the combined service brake and spring-loaded brake device 1. As is apparent in particular from FIG. 2, the fastening pin 56 is composed of, preferably, two elastically deformable limbs 60, 62, which project away from a base body 58 and which have an intermediate slot 64. The limbs 60, 62 have a cross section which is conical at the end and has an undercut so that the limbs 60, 62 bend radially inward on insertion into a breather 52, and spring back elastically in the outward direction after the locked position has been reached. As a result, the undercut can lock in behind an inner edge of the breather 52, and the fastening device 54 is therefore secured axially to the spring-loaded brake cylinder 12. The diameters of the fastening pin 56 and of the breather 52 are embodied such that the fastening device 54 can pivot freely about the pin axis with respect to the spring-loaded brake cylinder 12.

The slot 64 in the fastening pin 56, which permits the elastic movement of the limbs 60, 62 in the radially inward direction forms, at the same time, a connecting duct via which the interior of the annular chamber 50 is connected to the atmosphere. So that the slot 64 is not covered by the having wall 48 of the spring-loaded brake cylinder 12 in the inserted state of the fastening pin 56, two spacer elements, for example, are provided. The spacer elements are in contact with an outer surface of the having wall 48 of the spring-loaded brake cylinder 12 and are in the form of spacer pins 66 that project away from the base body 58 such that a slot 64 end section 68, extending over the having wall 48, is connected to the atmosphere at its sides, as is illustrated diagrammatically in FIG. 2. The end section 68 of the slot is consequently open on two sides and can communicate with the atmosphere. In this context, the fastening pin 56 is, for example, arranged between the two spacer pins 66. Alternatively, the connecting duct 64 could also extend through the base body 58 and then open into the atmosphere.

Furthermore, the base body 58 is provided with at least two standardized receptacles for elastic plastic cable ties 70, which receptacles point in different directions. Elastic plastic cable ties are sufficiently known. In general, they are composed of an elastically bendable plastic strip 72 with a tongue 74 at one end and a loop 76 at the other end, the surface of the tongue 74 being provided with locking projections which can lock in an opening in the loop 76 in a step-like manner such that, in order to tie up a bundle of cables and/or lines or else individual cables and/or lines, it is possible to set any desired wrap-around diameter and secure them in a way which is resistant to tension. Such an elastic plastic cable tie 70 is shown in FIG. 3, which is mounted on the fastening device 54 but still open. Such a plastic cable tie 70 can be connected to the standardized receptacles 78, 80, which project away from the base body 58 in the various directions and which are preferably formed by receptacle pins which have an undercut cross section and which can be locked into an opening of a fastening section 82 of a plastic cable tie 70. Such a fastening section 82 can be formed by a sleeve section with a plug-in opening, from which latching projections project away in the radially inward direction and engage behind the receptacle pins 78, 80 in the plugged in state.

The base body 58, the fastening pin 56, the spacer pins 66 and the receptacle pins 78, 80 can be constructed as a single-piece body made of plastic. In addition, the base body 58 can be provided with a through slot 84 for leading through an elastic plastic cable tie 70 which then does not have to have its own fastening section 82. It is also significant that such fastening devices 54 can be held in a plurality of breathers 52 since an exchange of air and the running off of condensed water is always ensured by way of the connecting ducts 64 in the fastening pins 56.

TABLE OF REFERENCE NUMERALS

1 Service brake and spring-loaded brake device
2 Service brake device

4 Service brake cylinder
6 Service brake piston
8 Service brake piston rod
10 Spring-loaded brake device
12 Spring-loaded brake cylinder
14 Spring-loaded brake chamber
16 Storage spring
18 Spring-loaded brake piston
20 Combination brake cylinder
22 Fastening bolts
24 Spring-loaded brake piston rod
26 Through opening
28 Dividing wall
30 Shoulder
32 Diaphragm
34 Piston disk
36 Edge
38 Service brake chamber
42 Edge
44 Flange
46 Return spring
48 Shell wall
50 Annular chamber
52 Breather (breather opening)
54 Fastening device
56 Fastening pin
58 Base body
60 Limb
62 Limb
64 Slot
66 Spacer pin
68 End section
70 Plastic cable tie or connector
72 Plastic strip
74 Tongue
76 Loop
78 Receptacle pin
80 Receptacle pin
82 Fastening section
84 Through slot

The invention claimed is:

1. A vehicle system, comprising:
a brake cylinder comprising a housing having an interior space;
at least one breather opening formed through the housing of the brake cylinder and opening into the interior space;
a fastening device operatively configured for externally fastening cables or lines, the fastening device comprising a base body and a fastening pin, the fastening pin being operatively configured to be locked into the breather opening of the housing of the brake cylinder; and
a connecting duct formed in the fastening pin, wherein the connecting duct connects the interior space of the housing to an exterior atmosphere of the brake cylinder in a locked state of the fastening device to the breather opening,
wherein
the fastening pin is locked in the breather opening such that the fastening device is pivotable about a pin axis of the fastening pin with respect to the housing of the brake cylinder,
the base body comprises at least two receptacles operatively configured to extend in different directions from the base body, the two receptacles being each adapted to receive a fastening section for an elastic plastic cable tie,
each of the two receptacles allow for a plastic cable tie to be locked to it, and
each of the two receptacles comprises a receptacle pin having an undercut cross-section, the receptacle pin being lockable into an opening formed in the fastening section of the plastic cable tie.

2. The vehicle system according to claim 1, wherein the fastening pin comprises at least two elastically deformable limbs projecting away from the base body of the fastening device, an intermediate slot forming the connecting duct being arranged between the at least two elastically deformable limbs.

3. The vehicle system according to claim 2, further comprising at least one spacer element projecting away from the base body of the fastening device, the spacer element contacting an outer surface of the housing, wherein when the spacer element is in contact with the outer surface, an end section of the intermediate slot that projects externally beyond the outer surface is connected to the exterior atmosphere at least at one side.

4. The vehicle system according to claim 2, wherein the base body of the fastening device comprises a slot, the slot being operatively configured so as to allow an elastic plastic cable tie to be fed therethrough.

* * * * *